Figure 1:
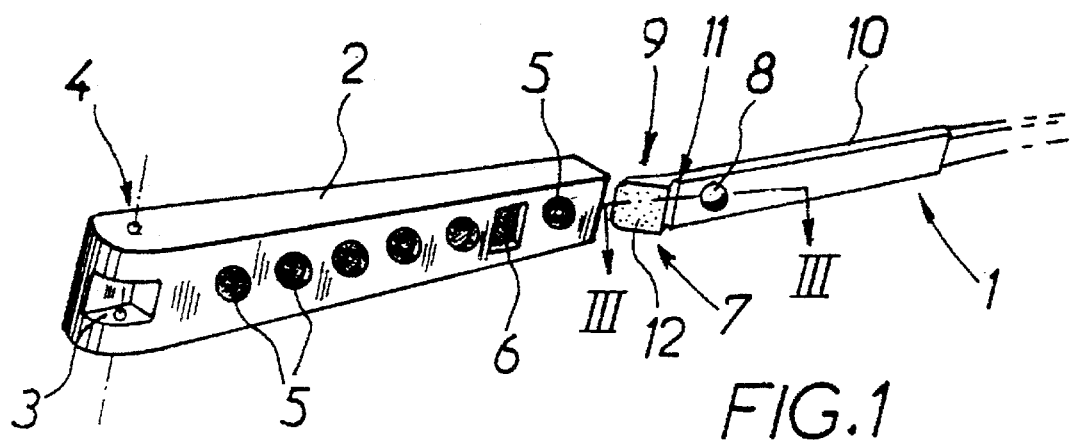

United States Patent

Bollé

[11] Patent Number: 5,668,619
[45] Date of Patent: Sep. 16, 1997

[54] DEVICE FOR LOCKING AN INTERCHANGEABLE, LENGTH-ADJUSTABLE SPECTACLE SIDE-PIECE

[75] Inventor: Robert Bollé, Oyonnax, France

[73] Assignee: Etablissements Bolle, Oyonnax, France

[21] Appl. No.: 557,280

[22] Filed: Nov. 14, 1995

[30] Foreign Application Priority Data

Nov. 15, 1994 [FR] France .................................. 94 13645

[51] Int. Cl.⁶ .............................. G02C 5/20; G02C 5/14
[52] U.S. Cl. .................................. 351/118; 351/116
[58] Field of Search .................................. 351/111, 116, 351/118, 119

[56] References Cited

U.S. PATENT DOCUMENTS

| | | | |
|---|---|---|---|
| 3,556,644 | 1/1971 | Stahl | 351/118 |
| 4,670,915 | 6/1987 | Evans | 351/116 X |
| 4,955,708 | 9/1990 | Kahaney | 351/44 |
| 5,483,303 | 1/1996 | Hirschman | 351/118 |

FOREIGN PATENT DOCUMENTS

| | | |
|---|---|---|
| 2 545 091 | 9/1968 | France . |
| 2 069 187 | 9/1971 | France . |
| 2 084 190 | 12/1971 | France . |
| 1 925 231 | 11/1970 | Germany . |
| 1 295 024 | 11/1972 | United Kingdom . |
| 2 338 972 | 11/1973 | United Kingdom . |

*Primary Examiner*—Huy Mai
*Attorney, Agent, or Firm*—Jacobson, Price, Holman & Stern, PLLC

[57] ABSTRACT

A sheath (2) constituting the fixed support of a lengthwise displaceable specatacle side-piece (1) is pierced by a plurality of round positioning holes (5) and a rectangular window (6) disposed in second position on the sheath, after the first positioning hole. The side-piece (1) bears, on the same face, a boss (7) having a rectangular head on a flexible end (9) of the side-piece, as well as another boss (8) having a round head on the rigid portion (10) of the side-piece. Application to spectacles with interchangeable side-pieces.

6 Claims, 1 Drawing Sheet

DEVICE FOR LOCKING AN INTERCHANGEABLE, LENGTH-ADJUSTABLE SPECTACLE SIDE-PIECE

The invention relates to an interchangeable spectacle side-piece and, more precisely, to its locking device enabling the length of the side-piece to be adjusted in relation to the frame.

It is known to be advantageous to be able to replace the side-pieces of a spectacle frame according to the wishes of the user, depending on whether he wishes or not to have a side-piece equipped with a curved end to afford a better grip, or for aesthetic reasons. It is also advantageous for the interchangeable side-piece in question to be length-adjustable in relation to the plane of the eyepieces so as to allow for the user's morphology and ensure a good fit, whatever the side-piece used. This is particularly applicable to novelty type spectacles, particularly plastic ones.

For this purpose, the Applicant has developed a locking device that enables the side-piece to be locked positively in relation to the frame in a position that is length-adjustable by the user, with a special security system preventing the side-piece from escaping from its support, without thereby preventing it from being removed if it is wished to replace the side-piece. For this purpose, the said side-piece support is constituted by a sheath within which the side-piece slides.

One main object of the present invention is thus a device for locking an interchangeable, length-adjustable spectacle side-piece, a device according to which the fixed support of a lengthwise displaceable spectacle side-piece is constituted by a sheath inside which the said side-piece slides, the sheath being pierced by a plurality of positioning holes and at by least one locking hole having a profile different from that of the positioning holes, and according to which the displaceable side-piece has on the same face a boss, the shape and size of which match the profile of the locking hole, as well as a boss matching the profiles of the positioning holes, the distance between the two bosses being equal to that between the locking hole and the closest positioning hole.

Advantageously, the positioning holes are round and the locking hole has the shape of a rectangular window which is disposed in second position on the sheath, after the first positioning hole, starting from the end opposite the hinge of the sheath.

In addition, one boss on the side-piece has a rectangular head and is disposed on one end of the side-piece which is flexible in relation to its rigid portion, while the other boss has a round head and is disposed on the said rigid portion.

Figure 2:
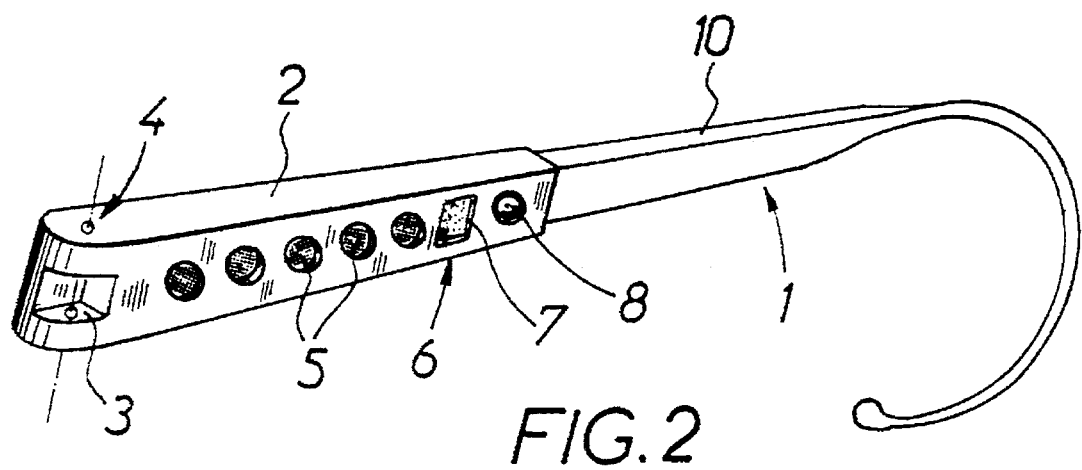
Figure 3:
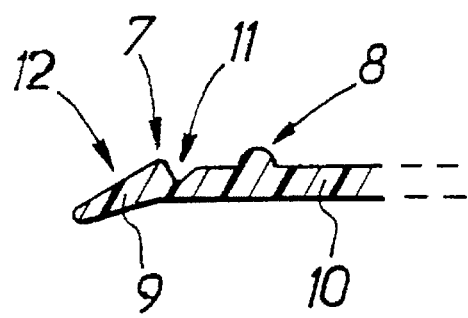

The complementary characteristics, as well as the advantages of the invention will emerge from the following description of a non-limitative example of a form of embodiment in which reference is made to the annexed drawings, which represent:

FIG. 1, a perspective view of the fixed support of a spectacle side-piece and of the said side-piece, non mounted;

FIG. 2, a perspective view of the sheath forming the said support and of the spectacle side-piece engaged in the sheath;

FIG. 3, a partial cross-sectional view, on a larger scale, of the end of the side-piece along line III—III of FIG. 1.

It can be seen from the figures that the fixed support of a lengthwise displaceable spectacle side-piece 1 is formed by a sheath 2, advantageously of rectangular cross-section, into which the end of side-piece 1 can be introduced and in inside which it can slide.

One end of the sheath 2 is specially shaped and has a recess 3 and orifices 4 thanks to which the sheath hinges upon the front face of the frame, not shown.

The inner face of sheath 2 is pierced by a plurality of positioning holes 5, which are round, except for the second of these holes, starting from the end opposite the hinge, which hole has the shape of a rectangular window 6. This window forms a locking hole, which thus has a different profile from that of the positioning holes.

The end 9 of side-piece 1 designed to fit into the sheath is flexible and, as it is not in alignment with the rest of the side-piece, that is to say its rigid portion 10, it performs the function of a spring inside the sheath. This end 9 bears, on its inner face, a boss 7, the rectangular head of which is suitably shaped and dimensioned to be able to be accomodated in window 6.

End 9 is flexible in relation to the rigid portion 10 of the side-piece 1 owing to the presence of a transverse recess 11 hollowed out in the side-piece. The front portion of end 9 of the side-piece is advantageously shaped to form an inclined face 12, as shown in FIG. 3. To the rear of boss 7 there is provided, on the other side of groove 11, another boss 8 having a round head—on the rigid portion 10 of the side-piece 1. The distance between bosses 7 and 8 is equal to that between window 6 and the first hole 5 that is the nearest. The round head of boss 8 is suitably dimensioned to penetrate a positioning hole.

Whene side-piece 1 is introduced into sheath 2, boss 7, owing to its relative flexibility by comparison with rigid portion 10, will be deviated and advance into the sheath. This advance is facilitated by the inclined plane 12, and the user can position boss 8 in the positioning hole 5 of his choice to obtain the desired length adjustment. This is made possible thanks to the relative flexibility of sheath 2, which enables the boss to pass between the holes.

When the reverse operation, i.e. withdrawal of the side-piece through the sheath, is effected, rectangular boss 7 crosses the round holes 5 without any difficulty, but it will be locked in rectangular window 6 owing to the elastic return bias of end 9 of the side-piece (position illustrated in FIG. 2). The side-piece cannot, therefore, escape accidentally from the sheath. If the user wishes to extract it completely, for example to replace a side-piece, all he has to do is exert a pressure on boss 7 projecting from window 6 and pull side-piece 1 outwards.

One thus obtains a plurality of positions for adjusting the total length of the side-piece, as well as a security type blocking device.

I claim:

1. Device for locking an interchangeable, displaceable and length-adjustable spectacle side-piece, the fixed support of which is constituted by a sheath inside which said side-piece slides, the sheath being pierced by a plurality of identical positioning holes, and the displaceable side-piece bearing at least one boss corresponding to the profiles of the positioning holes, wherein the sheath (2) in which the side piece (1) is displaceable additionally comprises at least one locking hole (6) in alignment with the positioning holes, the profile of which is different from that of the positioning holes (5), and the displaceable side-piece further comprises, on the same side, another boss (7) the shape and size of which match the profile of the locking hole, which boss is spaced from boss (8) corresponding to the profiles of the positioning holes by a distance equal to that between the locking hole and a positioning hole.

2. Locking device according to claim 1, wherein the positioning holes (5) are round and the locking hole has the shape of a rectangular window (6) which is disposed in a second position, on the sheath (2), after the first positioning hole, starting from the end opposite the hinge of the sheath.

3. Device for locking an interchangeable, displaceable and length-adjustable spectacle side-piece, the fixed support of which is constituted by a sheath inside which said side-piece slides, the sheath being pierced by a plurality of identical positioning holes, and the displaceable side-piece bearing at least one boss corresponding to the profiles of the positioning holes, wherein the side-piece (1) displaceable inside the sheath (2) additionally comprises at least one locking hole (6) the profile of which is different from that of the positioning holes (5), and the displaceable side-piece further comprises, on the same side, another boss (7) the shape and size of which match the profile of the locking hole, which boss is spaced from boss (8) corresponding to the profiles of the positioning holes by a distance equal to that between the locking hole and a positioning hole wherein the boss (7) of the side-piece (1) has a rectangular head and is disposed on one end (9) of the side-piece which is flexible in relation to its rigid portion (10), and the boss (8) has a round head and is disposed on the said rigid portion.

4. Locking device according to claim 3, wherein a transverse recess (11) is hollowed out in the side-piece (1) between the two next bosses (7, 8).

5. Locking device according to claim 3, wherein the front portion (9) of the side-piece (1) is profiled to form an inclined face (12).

6. Locking device according to claim 3, wherein the front portion (9) of the side-piece (1) is not in alignment with the rigid portion (10).

* * * * *